F. B. DEANS.
BOLSTER GUIDE LINK FOR RAILWAY TRUCKS.
APPLICATION FILED MAY 24, 1917.
1,264,491.
Patented Apr. 30, 1918.
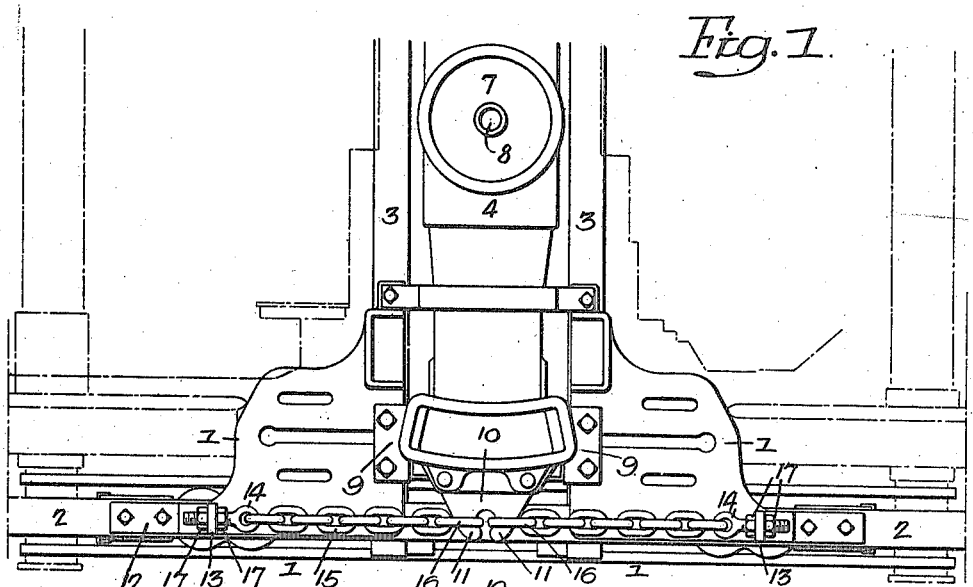
Fig. 1.
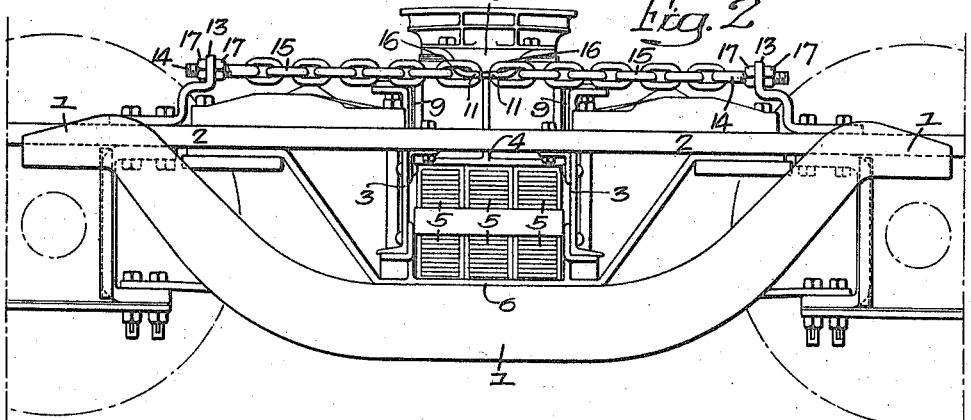
Fig. 2.
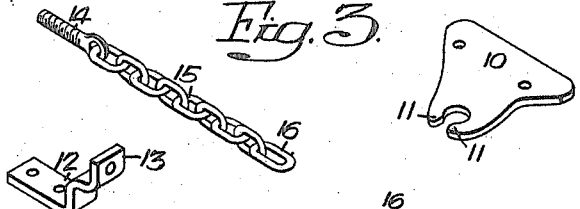
Fig. 3.
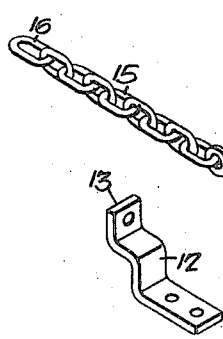
Inventor:-
Frank B. Deans.
by his Attorneys-

UNITED STATES PATENT OFFICE.

FRANK B. DEANS, OF SHARON HILL, PENNSYLVANIA, ASSIGNOR TO THE BALDWIN LOCOMOTIVE WORKS, OF PHILADELPHIA, PENNSYLVANIA, A CORPORATION OF PENNSYLVANIA.

BOLSTER-GUIDE LINK FOR RAILWAY-TRUCKS.

1,264,491.      Specification of Letters Patent.      Patented Apr. 30, 1918.

Application filed May 24, 1917. Serial No. 170,698.

*To all whom it may concern:*

Be it known that I, FRANK B. DEANS, a citizen of the United States, and a resident of Sharon Hill, county of Delaware, State of Pennsylvania, have invented certain Improvements in Bolster-Guide Links for Railway-Trucks, of which the following is a specification.

My invention relates to certain improvements in railway trucks, particularly those used for electric railway trucks in which the trucks carry the motors. In this type of truck, when the motor starts, the chafing plates are subjected to considerable shock and when the brakes are applied the parts are also subjected to shock.

The object of my invention is to provide mechanism for connecting the bolster to the frame of the truck in such a manner that the shock will be taken up by this mechanism and not by the chafing plates. This mechanism will also tend to hold the bolster against undue vertical movement and lateral movement.

In the accompanying drawings:

Figure 1 is a plan view of one-half of a portion of an electric railway truck illustrating my invention;

Fig. 2 is a side view; and

Fig. 3 is a perspective view showing my improved mechanism detached.

Referring to the drawings, 1 is the truck having longitudinal side bars 2 at each side thereof. These side bars are connected together by the ordinary transoms 3 spaced apart and between these transoms is located the truck bolster 4. Springs 5 are located between the bolster and the spring plate 6 secured to the transoms. 7 is the center bearing for the truck bolster recessed to receive the center bearing of the body bolster and having a hole 8 therein for the king pin. Secured to each transom are the usual chafing plates 9 against which the bolster comes in contact when any fore and aft shock is given to the truck. In the type of truck to which my invention is particularly adapted the motors are mounted on axles and the axles are driven directly from the motors, consequently, the moment power is applied the truck is moved forward and the chafing plates strike the bolster. Therefore, the strain is placed between the bolster and the center bearing.

By my invention, I relieve the plates of the pressure and transmit the strain to the bolster through a series of links. In the present instance, I secure a plate 10 to each end of the bolster 4, one of such plates being clearly shown in Figs. 1 and 2. Formed on this plate are hooks 11, in the present instance, and secured to each side frame 2 on each side of the center of the truck are plates 12 having upturned portions 13, which are perforated for the reception of eye bolts 14 connected to the chains 15, which are composed of a series of links. The end links 16 of the chains engage the hooks 11, as shown. On the eye bolts 14 are nuts 17, the bolts passing through openings in the projections 13 in the plate 12 so that, on turning the nuts, the tension of the chains 15 can be regulated in order to make the connection between the bolster and the frame of any degree desired so that the strains will be transmitted through this chain connection rather than through the chafing plates and transoms. Furthermore, this arrangement prevents undue rocking of the truck bolster, as it tends to hold the body bolster in position. It also prevents or dampens the lateral movement of the truck bolster.

I claim:

1. The combination in a railway truck, of a frame; a truck bolster mounted in the frame; means for supporting the truck bolster; and flexible means arranged longitudinally in respect to the truck and attached to each end of the bolster and to the frame at each side of the bolster so that the shock due to starting and braking will be taken by the frame through the said flexible means.

2. The combination in a railway truck, of a frame; a bolster mounted in the frame and having a center bearing for the body bolster of the car; and chains connected to each end of the truck bolster and attached to the side frames of the truck at each side of the bolster.

3. The combination in a truck, of side frames; transoms connecting the side frames, said frames being spaced apart; a truck bolster mounted in the space between the transoms and having a center bearing for the body bolster; chains attached to each end of the truck bolster; and means for detachably connecting the chains with the frame so that the shock due to starting and braking will be taken by the frame through the chains.

4. The combination in a truck, of side frames; transoms connecting the side frames; a truck bolster mounted in the space between the transoms and supported on the frame of the truck and having a center bearing for the body bolster having hooked plates at each end; two sets of chains at each side of the truck secured to the hooks of the body bolster and to the side frames of the truck.

5. The combination in a motor driven truck, of side frames; transoms connecting the side frames; springs carried by the truck; a bolster located between the transoms and mounted on the springs and having a center bearing for the bolster carried by the car body; a projecting plate at each end of the bolster; plates secured to the frame of the truck on each side of the bolster; chains connecting the plates on the frame with the plates on the bolster; and means for adjusting the chains, said chains preventing excessive wear and hammering on the chafing plates of the truck and also limiting the movement of the bolster both vertically and laterally.

In witness whereof I affix my signature.

FRANK B. DEANS.

Copies of this patent may be obtained for five cents each, by addressing the "Commissioner of Patents, Washington, D. C."